Nov. 15, 1960 T. H. BONN 2,960,681

TRANSISTOR FUNCTION TABLES

Filed Aug. 5, 1955 4 Sheets-Sheet 1

INVENTOR.
THEODORE H. BONN
BY
Charles C. English
AGENT

INVENTOR.
THEODORE H. BONN
BY
Charles C. English
AGENT

INVENTOR.
THEODORE H. BONN
BY
Charles C. English
AGENT

Nov. 15, 1960 T. H. BONN 2,960,681

TRANSISTOR FUNCTION TABLES

Filed Aug. 5, 1955 4 Sheets-Sheet 4

INVENTOR.
THEODORE H. BONN
BY
Charles C. English
AGENT 2,960,681

TRANSISTOR FUNCTION TABLES

Theodore H. Bonn, Philadelphia, Pa., assignor to Sperry Rand Corporation, New York, N.Y., a corporation of Delaware Filed Aug. 5, 1955, Ser. No. 526,652

17 Claims. (Cl. 340—147)

The present invention relates to switching matrices or function tables, and is more particularly concerned with such devices employing transistors for the selective control of current flow to a plurality of loads. In this respect, the present invention provides a novel disposition of input and output lines coupled to one another by a plurality of transistor elements whereby a resulting function table exhibits better operating characteristics than has been the case heretofore, when diodes were used for such devices.

Function tables are employed in many switching arrangements and find considerable utility, for instance in digital computation devices. For the most part, these switching matrices or function tables employ diode elements, and driving sources are utilized for selectively coupling energy via the said diodes to selected ones of a plurality of output lines thereby to drive loads coupled to the said lines. Because of the use of such diode elements, function tables in the past have acted to attenuate energy from the driving sources, thus imposing certain minimum restrictions on the power of the driving sources which may be employed, as well as upon the utilization which may be made of the over-all system.

The present invention serves to obviate these difficulties and provides novel function table arrangements utilizing suitably disposed transistor elements for selectively energizing output lines in response to preselected input signals, whereby the function table has power gain rather than the attenuation experienced heretofore. Because of this characteristic of the present invention, the novel function tables to be described may be operated with extremely low level signals whereby the decreased attenuation of the system permits greater efficiency to be achieved. In certain of the arrangements of the present invention, considerable economy of switching elements is further achieved by selectively driving plural electrodes of the transistors employed to achieve the desired switching function.

It is accordingly an object of the present invention to provide novel switching matrices or function tables.

A further object of the present invention resides in the provision of function tables employing transistor elements.

A still further object of the present invention resides in the provision of novel function tables exhibiting power gain rather than the attenuation characteristic of function tables known heretofore.

Another object of the present invention resides in the provision of novel function tables which may operate in response to signal inputs of lower power level than has been the case heretofore.

Still another object of the present invention resides in the provision of novel function tables utilizing fewer switching elements than has been the case heretofore.

A further object of the present invention resides in the provision of function tables utilizing transistor elements wherein switching may be effected by selectively driving more than one electrode of the said transistor elements.

Another object of the present invention resides in the provision of function tables having a higher efficiency of operation than has been the case with function tables utilized in the past.

In accordance with the foregoing objects and advantages of the present invention, function tables may comprise a plurality of input and output lines selectively coupled to one another via a plurality of transistor elements exhibiting power gain. A plurality of loads may be coupled to the output lines respectively, and these loads may be so arranged with respect to the transistor elements employed that by changing the state of conductivity of certain transistor elements through the medium of input signals, current is coupled to preselected ones of the said loads.

In accordance with certain arrangements of the present invention, the transistor elements may have only a single electrode controlled by the said input signals thereby to effect the desired switching and control functions. In accordance with still further embodiments of the present invention, however, more than one electrode of the transistors employed may be controlled by signal sources whereby the desired switching functions are accomplished with a greater economy of switching elements than has been the case in the past.

The foregoing objects, advantages, construction and operation of the present invention will become more readily apparent from the following description and accompanying drawings, in which.

Figure 1:
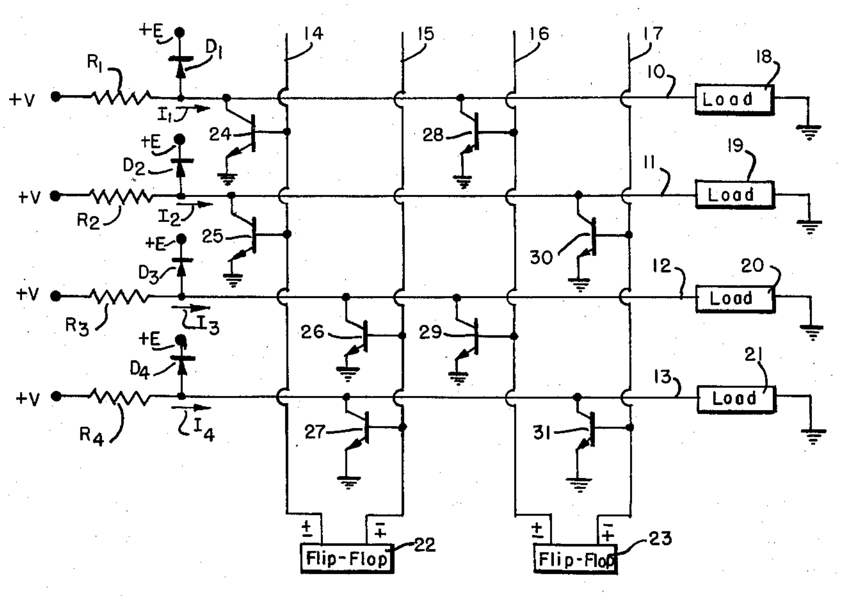
Figure 1 is a schematic diagram of a function table constructed in accordance with one embodiment of the present invention and wherein only a single load is energized at a time.

Referring now to Figure 1, it will be seen that, in accordance with the present invention, a function table may comprise a plurality of output lines 10 through 13 inclusive, selectively controlled by a plurality of input lines 14 through 17 inclusive. In the particular arrangement illustrated in Figure 1, a total of four input lines are employed for selectively driving a total of four output lines; but it will be appreciated that more or less input lines and output lines may be employed without departing from the concepts of the present invention. Each of the output lines 10 through 13 inclusive, is coupled at one of its ends to a load 18 through 21 respectively, and is coupled at the other of its ends to constant current sources comprising voltage sources V and resistors R1 through R4, which produce currents I1, I2, I3 and I4.

In addition, each of lines 10 through 13 inclusive includes a clamping diode D1, D2, D3 and D4 respectively, each of which clamping diodes is coupled to a source +E, whereby the output lines are clamped at the potential +E. This potential +E is assumed, for purposes of the present discussion, to be the maximum safe operating potential on the several transistors to be described, and it will be appreciated that the several clamping diodes D1 to D4 are here illustrated for purposes of completeness only and that, in many cases, they will not be necessary or their functions might be performed by further circuit connected for instance to the output of the function table.

Input lines 14 and 15 are coupled to a flip-flop 22, and input lines 16 and 17 are similarly coupled to a further flip-flop 23. Each of flip-flops 22 and 23 provides a pair of output potentials, as shown, and these potentials are so characterized that when input line 14 is positive, input line 15 will be negative, and vice versa; and that when input line 16 is positive, input line 17 will be negative, and vice versa. The several input lines are coupled to the several output lines by the transistors arranged as shown. Thus, input line 14 is coupled to output lines 10 and 11 by transistor elements 24 and 25 respectively. Input line 15 is coupled to output lines 12 and 13 by transistor elements 26 and 27 respectively. Input line 16 is coupled to output lines 10 and 12 by transistor elements 28 and 29 respectively; and input line 17 is coupled to output lines 11 and 13 by transistor elements 30 and 31 respectively.

Figure 2:
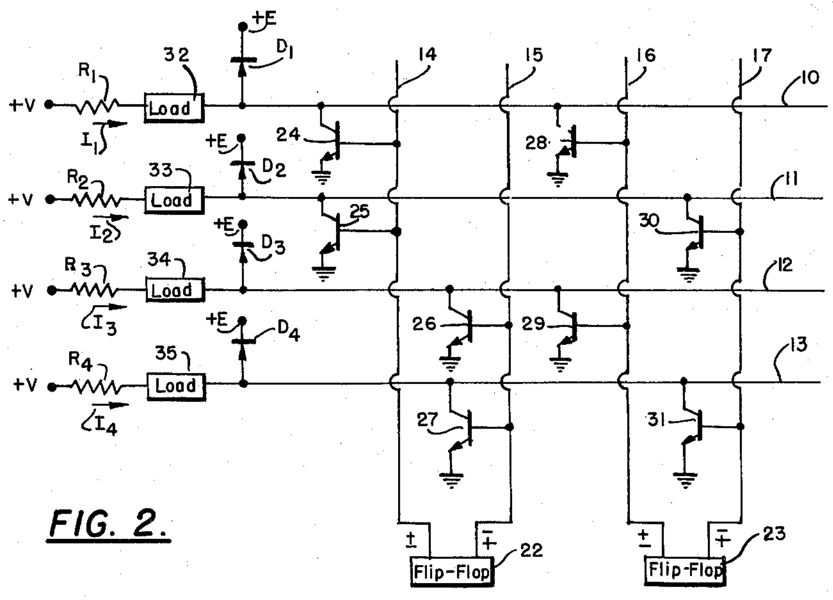
Figure 2 is a modification of the arrangement shown in Figure 1, utilizing a different disposition of loads so that all but one load may be energized at a given time.
Figure 3:
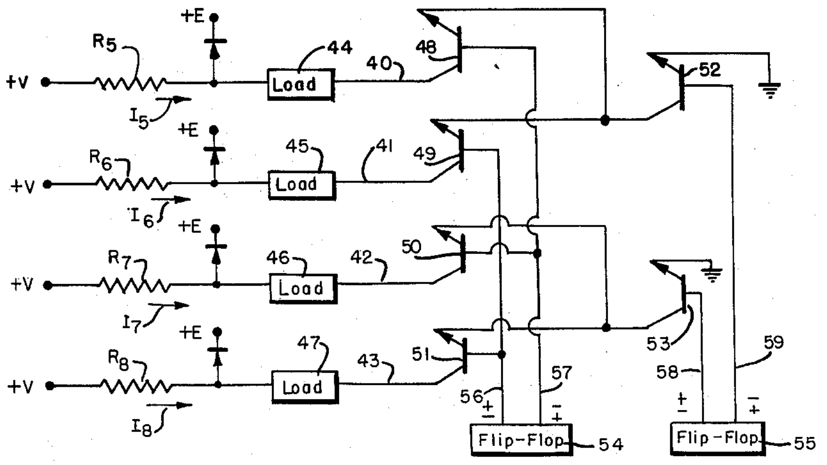
Figure 3 is a still further embodiment of the present invention utilizing fewer switching elements in selectively energizing one load than is the case in the embodiment of Figure 1.
Figure 4:
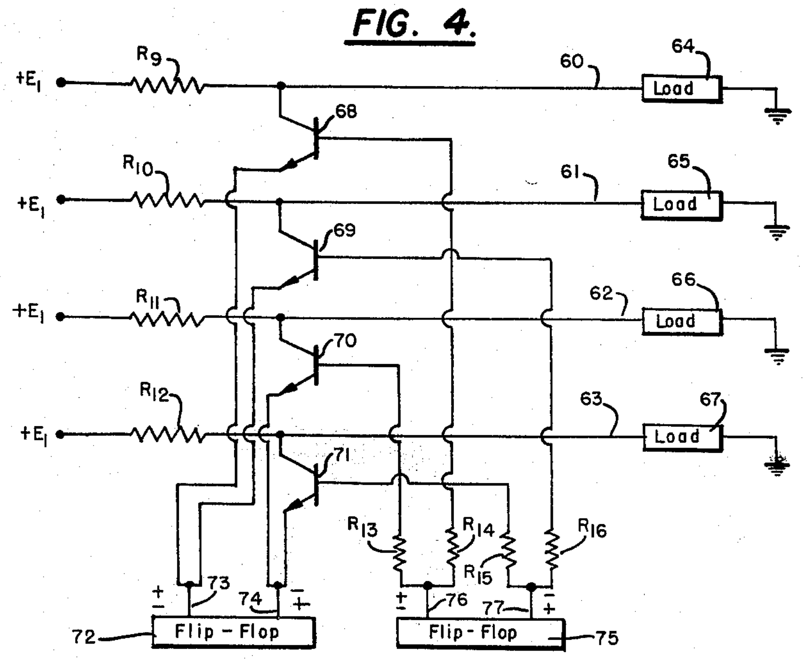
Figure 4 is still another embodiment of the present invention wherein plural electrodes of transistor elements employed are controlled by signal sources, thereby to effect a still further economy of switching elements, and which selectively energizes all but one load.

In the particular arrangement of Figure 1, as well as in the arrangements of Figures 2 through 4, type NPN transistors have been assumed, although it will be appreciated that the invention will operate as well with PNP or other types of transistors. Similarly, it will be noted that, in the arrangement of Figure 1, each of the transistors 24 through 31 utilizes a grounded emitter connection; but again it will be apparent that a grounded base or grounded collector connection also could be employed, if desired.

In operation, the several transistors 24 through 31 may assume either a low impedance or a high impedance state in response to controlling signal inputs from the flip-flops 22 and 23. Inasmuch as the loads 18 through 21 are coupled to an end of the several output lines opposite to that coupled to the constant current sources, an output will be passed to a preselected one of the said loads only when all transistors coupled to the corresponding output line are in a high impedance state. If, due to the input signals applied, one or more of the said transistors associated with a given output line should be switched to a low impedance state, current from the associated constant current source will be shunted to ground through the said transistor, and will not be coupled to the load. Inasmuch as NPN type transistors have been employed, any given transistor will be in a low impedance state when its base is switched positive by one of the flip-flops 22 or 23 coupled to its associated input line.

Thus, if lines 14 and 16 should be switched positive by flip-flops 22 and 23, each of transistors 24, 25, 28 and 29 will assume a low impedance state and current will be coupled only to load 21 from the constant current source comprising V and R4. Similarly, if lines 15 and 16 are switched positive, transistors 26, 27, 28 and 29 will assume a low impedance state and current will be passed only to the load 19 from the source comprising V and R2. A similar analysis applies to the several other possible input line potential arrangements; and it will be appreciated that, due to the arrangement of Figure 1, for any given setup of flip-flops 22 and 23 one and only one of the loads 18 through 21 will be energized from its associated constant current source. Due to the use of transistors, moreover, which of the loads is energized may be controlled by the relatievly low output power of the flip-flops 22 and 23, and the over-all function table will in fact exhibit a power gain rather than the attenuation present in function tables known heretofore.

As described in reference to Figure 1, the several loads are individually energized from their associated power sources, and when one load is so energized, the other loads will not be energized. In certain arrangements, however, the converse of this operating characteristic is desired, in that all but one of the several loads should be energized in response to a given control signal input. This operating characteristic may be achieved by the arrangement shown in Figure 2, and it will be seen by examination of Figures 1 and 2, that the disposition of the several transistor elements with respect to the input and output lines and with respect to the constant current sources and clamping diodes may be the same as was the case in Figure 1. Common numerals have accordingly been employed in Figures 1 and 2 and the operation of the arrangement of Figure 2 is the same as has been described in reference to Figure 1 except for the disposition of the several loads.

Thus, in the arrangement of Figure 2, loads 32 through 35 inclusive are disposed in series with the several control transistors 24 through 30 inclusive, rather than being parallel with them as is the case with the loads 18 through 21 of Figure 1. Due to this disposition of loads in Figure 2, therefore, current will be passed from a given constant current source through a load in series therewith only when at least one of the transistors coupled to the associated output line is in a low impedance state. This, of course, is the direct converse of the operation described in Figure 1, in that, in the arrangement of Figure 1, no current was coupled to the load when at least one of the transistors coupled to its associated output line was in a low impedance state. The relative outputs of the flip-flops 22 and 23 of Figure 2 are precisely the same as those of Figure 1 and, therefore, due to the disposition of loads in Figure 2, only one load will be de-energized, rather than energized, for a given input signal configuration. By way of example, if input lines 14 and 16 should be positive the transistors 24, 25, 28 and 29 will be in the low impedance state whereby current I1, I2 and I3 may flow through the loads 32, 33 and 34 in the output lines 10, 11 and 12. Inasmuch as each of transistors 27 and 31 is in a high impedance state, however, no current may flow in the output line 13, and no power will be coupled to load 35. A similar analysis applies to the other possible input signal configurations from the flip-flops 22 and 23.

Each of the arrangements shown in Figures 1 and 2 utilizes a total of eight transistors for switching a total of four output lines from the four input lines coupled to the flip-flops. By utilizing a different disposition of transistor elements, however, a certain economy of these elements may be achieved without detracting from the operation of the system. Thus, referring to Figure 3, an arrangement is shown wherein a total of only six transistor elements are employed for the switching of four output lines. In this particular arrangement, the output lines have been designated as 40 through 43 inclusive, and these lines are each coupled at one of their ends to a constant current source comprising potential source V and resistors R5 through R8 inclusive; and include clamping diodes operating in the manner discussed in reference to Figures 1 and 2.

The output lines 40 through 43 include loads 44 through 47 inclusive; and each of these output lines 40 through 43 is further coupled at one of its ends to transistors 48 through 51 respectively. A further pair of transistors 52 and 53 is also employed, and these latter transistors are coupled to the several transistors 48 through 51, as shown. Controlling signal inputs are provided by flip-flops 54 and 55, selectively driving input lines 56 through 59 inclusive. Input line 56 is coupled to the base of transistors 49 and 51, while input line 57 is coupled to the base of transistors 48 and 50. Input line 58 controls the base of transistor 53, while input line 59 controls the base of transistor 52. The emitters of transistors 48 and 49 are connected in parallel to the collector of transistor 52, while the emitters of transistors 50 and 51 are similarly coupled in parallel to the collector of transistor 53; and the emitters of each of transistors 52 and 53 are grounded, as shown.

In operation, current may pass from a given constant current source through a given load only when a return path to ground is provided through the several transistor elements 48 through 53. Due to the relative disposition of the several transistor elements, however, one and only one such return path to ground is provided for any given signal output arrangement of flip-flops 54 and 55, whereby a single one of the loads 44 through 47 is energized for a given controlling signal arrangement from the pair of flip-flops; and the other loads are deenergized. By way of example, let us assume that lines 56 and 58 are positive whereby transistor elements 51, 49 and 53 are switched to a low impedance state. For this particular disposition of input signals, current I8 will flow through the load 47 and thence through the line 43 and transistors 51 and 53 to ground. No ground return, however, is provided for any of the other loads, whereby loads 44, 45 and 46 remain deenergized. Similarly, if lines 57 and 58 should be switched positive, current I7 will flow through load 46 and thence via transistors 50 and 53 to ground, whereby load 46 is energized and the other loads remain de-energized. A similar analysis applies to the other possible controlling signal configurations from the flip-flops 54 and 55.

As described in reference to Figure 3, several loads are individually energized from their associated power sources and when one load is so energized the other loads will not be energized. In certain arrangements, however, the converse of this operating characteristic is desired in that all but one of the several loads should be energized in response to given control signal input. This operating characteristic may be achieved by the arrangement shown in Figure 3A and it will be seen by comparison of Figure 3 and Figure 3A that the disposition of the several transistors with respect to the input and output lines and with respect to the constant current sources and clamping diodes may be the same as was the case in Figure 3. Common numerals have accordingly been employed in Figures 3 and 3A and the operation of the arrangement of Figure 3A is the same as has been described in reference to Figure 3 except for the disposition of the several loads.

Figure 3A:
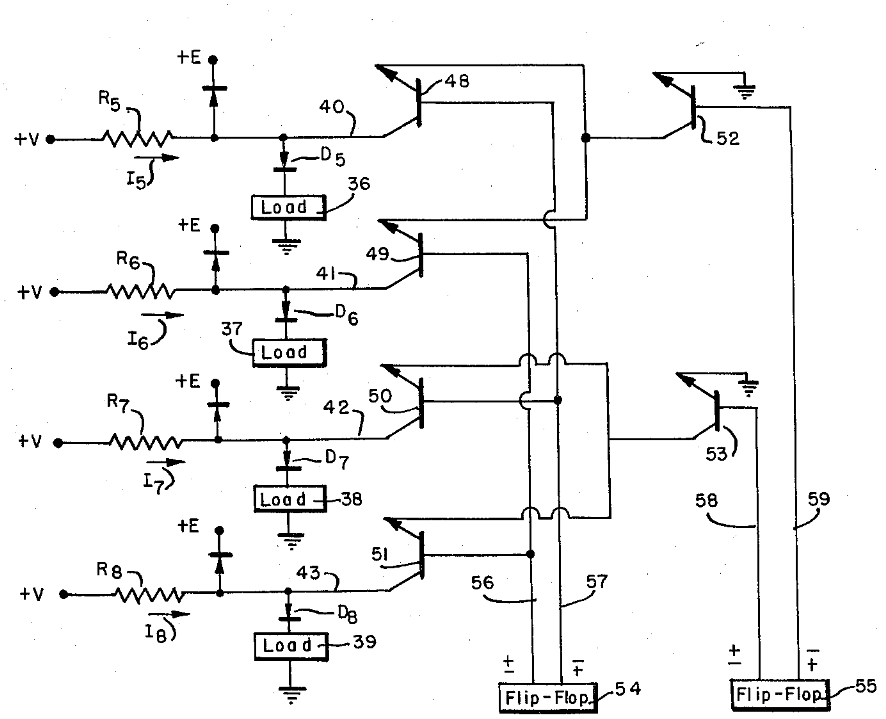
Figure 3A is an additional embodiment of the present invention which uses fewer switching elements than the embodiment of Figure 2 and which selectively energizes all but one load at a time.

Thus, in the arrangement of Figure 3A, loads 36 through 39 inclusive are connected in parallel with the several control transistors 48 through 53 inclusive rather than being in series with them as is the case with the loads 44 through 47 inclusive in Figure 3. Due to this disposition of loads, therefore, current will be passed from the given constant current source through a load in series therewith only when at least one of the transistors coupled to the associated output line is in a high impedance state. This, of course, is once more the converse of the operation described in Figure 3 in that, in the arrangement of Figure 3, no current was coupled to a load when at least one of the transistors coupled to its associated output line was in a high impedance state. The relative outputs of the flip-flops 54 and 55 of Figure 3A are precisely the same as those of Figure 3, and due to the disposition of loads in Figure 3A only one load will be de-energized rather than energized for a given input signal configuration. Rectifiers D5 through D8 prevent flow in the reverse direction through loads which are de-energized. By way of example, if input lines 56 and 58 should be negative, the transistors 49, 51 and 53 will be in the high impedance state whereby currents I6, I7 and I8 will flow through the loads 37, 38 and 39. Since transistors 48 and 52 will be in the low impedance state, current I5 will be shunted through these transistors and will not flow in load 36. A similar analysis applies to the other possible input signal configurations for the flip-flops 54 and 55.

A still greater economy of transistor elements may be achieved by selectively driving more than one electrode of the switching transistors. Thus, in the arrangement of Figure 4, the several transistors have both their bases and emitters selectively energized, whereby the transistors act as two-input gates, and half as many transistors are employed in the function table as would be employed if diodes or the arrangements of Figures 1 or 2 were utilized. It will be appreciated, of course, that any pair of control elements of the several transistors may be so controlled, and other arrangements will be suggested to those skilled in the art. It should further be noted that the economy of transistor elements achieved by driving a pair of control electrodes rather than the single electrode drive described heretofore, is at the expense of power gain inasmuch as greater driving power must be utilized. Nevertheless the function table of Figure 4 for instance, still achieves a certain power gain and, due to the accompanying economy of switching elements, this form of the invention is extremely valuable.

Referring to the particular arrangement of Figure 4, it will be seen that the function table may comprise a plurality of output lines 60 through 63 inclusive, coupled respectively to a plurality of loads 64 through 67 inclusive. The several output lines 60 through 63 are also coupled to constant current sources comprising potential sources E1 and resistors R9 through R12 inclusive. Output lines 60 through 63 are selectively controlled by transistors 68 through 71 inclusive, there being a single transistor for each output line in the arrangement shown; and the collectors of the several transistors 68 through 71 are connected respectively to the several output lines 60 through 63.

The emitters of transistors 68 and 69 are coupled in parallel to one side of flip-flop 72, represented by input line 73; and the emitters of transistors 70 and 71 are coupled to the other side of the said flip-flop 72, represented by input line 74. Similarly, the bases of transistors 68 and 70 are coupled via resistors R13 and R14 to one side of flip-flop 75, represented by input line 76; while the bases of transistors 69 and 71 are coupled via resistors R15 and R16 to the other side of flip-flop 75, represented by input line 77. Thus, examining the circuit as a whole, it will be seen that a single transistor is employed for switching each of the output lines, and that the collector of each of these transistors is coupled to its associated output line; while the emitters of the several transistors are coupled to one flip-flop and the bases of the several transistors are coupled to a second flip-flop.

In operation, when the transistor coupled to a given output line is in a high impedance state, that transistor cannot draw current from its associated source $+E_1$ via its associated resistor R9 through R12, whereby the line will be at a potential $+E_1$. If, however, the transistor is switched to a low impedance state, the said transistor will conduct, and the output potential of the line will drop to a value below $+E_1$, thereby giving a significant output. By way of example, if lines 73 and 76 are switched positive by flip-flops 72 and 75, only transistor 70 will have its base switched positive with respect to its emitter, and transistor 70 will draw current from the source $+E_1$ via resistor R11, dropping the potential of line 62 to a value below $+E_1$. The other lines 60, 61 and 63 will remain at the $+E_1$ potential. A similar analysis applies to the several other possible output configurations of flip-flops 72 and 75.

The resistors R13 to R16 inclusive are provided to limit base current. For example, when transistor 70 conducts, in the manner described above, it draws sufficient current through its base electrode via resistor R13 to drop the base potential substantially to the emitter potential, and the current in the base of transistor 70 is thus determined by resistor R13 as well as by the relative potentials of lines 74 and 76. The same analysis, of course, applies to the other transistors 68, 69 and 71.

As described, an output is signified in the ararngement of Figure 4 by a drop in output potential below the value $+E_1$. It will be appreciated, however, that this state of operation may also be considered to provide outputs on all but one of the output lines and that the outputs are signified by the presence of a $+E_1$ potential, while no output is achieved when the potential of an output line drops below $+E_1$.

As described in reference to Figure 4, all but one load is selectively energized for each combination of input signals. In certain arrangements, however, the converse of this operating characteristic is desired in that only one of the several loads should be energized in response to given control signal input. This operating characteristic may be achieved by the arrangement shown in Figure 4A, and it will be seen by examination of Figure 4 and 4A that the disposition of the several transistors with respect to the input and output lines and with respect to the constant current sources may be the same as was the case in Figure 4. Common numerals have accordingly been employed in Figures 4 and 4A, and the operation of the arrangement of Figure 4A is the same as has been described in reference to Figure 4 except for the disposition of the several loads.

Figure 4A:
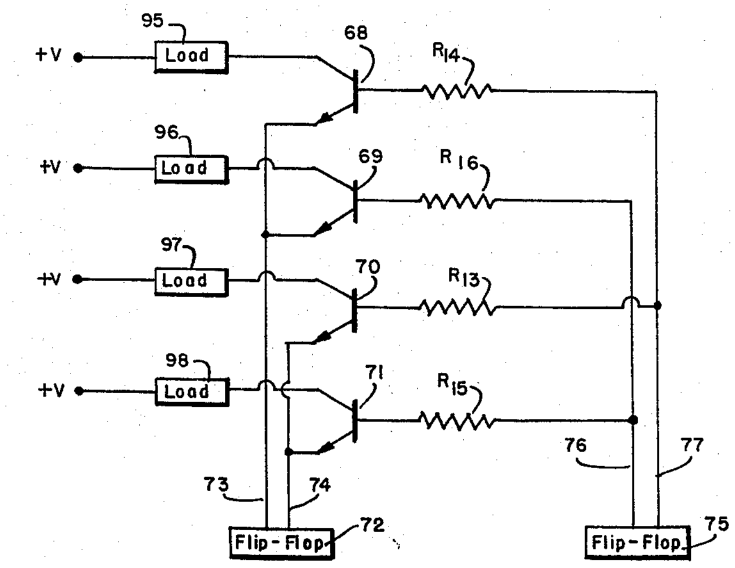
Figure 4A is a further embodiment of the present invention in which plural electrodes of each switching element are used for control, and which selectively energizes a single load at any given time.

Thus, in the arrangement of Figure 4A, loads 95 through 98 inclusive are connected in series with the several control transistors 68 through 71 inclusive rather than being in parallel with them as is the case with the loads 64 through 67 inclusive in Figure 4. Due to this disposition of loads, therefore, current will be passed from the given constant current source through a load in series therewith only when the transistor to which it is coupled is in a low impedance state. This, of course, is again the direct converse of the operation described for Figure 4 in that, in the arrangement of Figure 4, no current was coupled to a load when the transistor to which the said load was coupled was in a low impedance state. The relative outputs of the flip-flops 72 and 75 of Figure 4A are precisely the same as those of Figure 4, and due to the disposition of loads in Figure 4A only one load will be energized rather than de-energized for a given input signal configuration. By way of example, if input line 73 should be negative and input line 77 should be positive, transistor 68 only will be in the low impedance state whereby current will flow through load 95 only. Since transistors 69, 70 and 71 will be in a high impedance state, no current will flow in loads 96, 97 and 98. A similar analysis applies to the other possible input signal configurations for the flip-flops 72 and 75.

Figure 5:
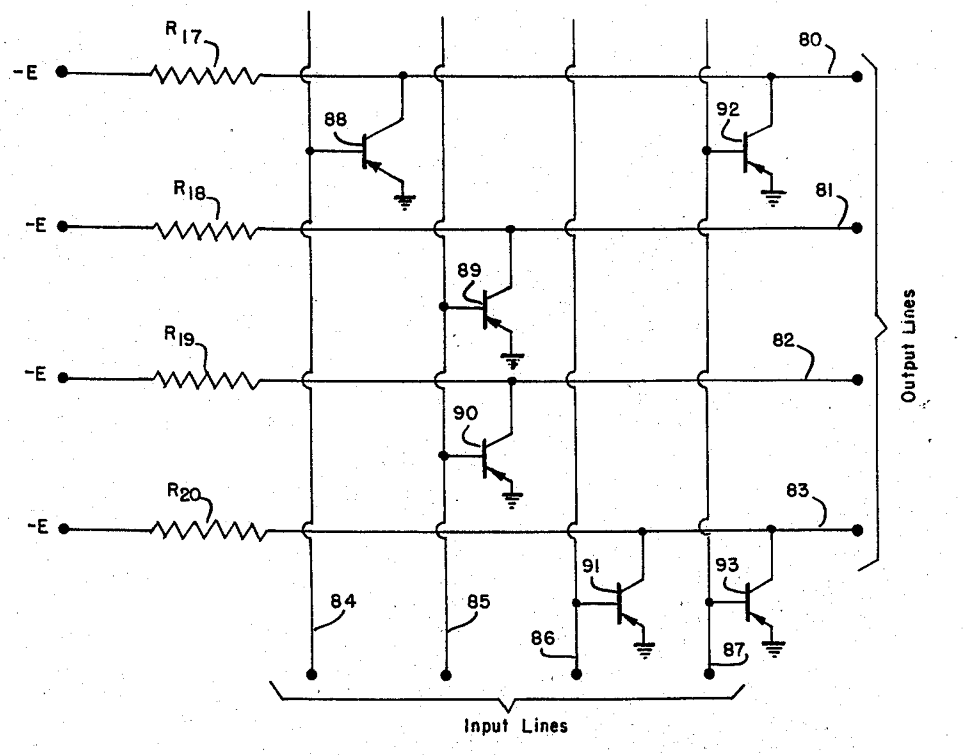
Figure 5 is a still further embodiment of the present invention acting as a transistor encoding function table.

A transistor encoding function table is shown in Figure 5, and this particular arrangement employs PNP type transistors to illustrate one possible variation in the transistor types which may be utilized in the several embodiments of the present invention. The arrangement of Figure 5 again comprises a plurality of output lines 80 through 83 inclusive, and a plurality of input lines 84 through 87 inclusive. Input line 84 is connected to output line 80 via transistor 88. Input line 85 is connected to output lines 81 and 82 via transistors 89 and 90. Input line 86 is connected to output line 83 via transistor 91, and input line 87 is connected to output lines 80 and 83 via transistors 92 and 93. The several output lines 80 through 83 are also coupled at one of their ends to a source of negative potential —E, via resistors R17 through R20 respectively; and the several transistors once more are shown to utilize the grounded emitter connection by way of example only.

In operation, and due to the use of PNP type transistors, a given transistor will be switched to a low impedance state when its base is switched negatively with respect to its emitter. When a transistor coupled to a given output line is so switched to a low impedance state, current will flow from ground through the emitter of the said transistor and thence via one of the resistors, R17 through R20, to the source of negative potential —E, whereby the appropriate line 80 through 83 will rise to a potential which is positive with respect to —E, thereby to give a significant output. Thus, if line 84 should be switched negative, while lines 85 through 87 are positive, output line 80 will swing positively from —E, while output lines 81 through 83 will remain at the —E potential. If line 85 should go negative, while the other input lines remain positive, output lines 81 and 82 will swing positive, from —E, while lines 80 and 83 remain at the negative potential —E. A similar analysis applies for negative switching of line 86, and of line 87.

While I have described preferred embodiments of the present invention, it will be appreciated that this description is meant to be illustrative only and is not limitative of my invention. Many variations will be suggested to those skilled in the art, and all such variations as are in accord with the principles discussed, are meant to fall within the scope of the appended claims.

Having thus described my invention, I claim:

1. A function table comprising a plurality of loads, an energization source, means coupling said energization source to each of said loads, an individual transistor coupled in parallel to each of said loads, said transistors each having one electrode thereof connected to said coupling means at a point between said energization source and said loads, first signal means coupled to second electrodes of said transistors and second signal means coupled to third electrodes of said transistors, the impedance of said transistors being dependent upon the relative signal output states of said first and second signal means, whereby a selected load may be energized by said energization source only when the transistor coupled thereto is in a high impedance state, said first and second signal means each comprising a flip-flop having first and second outputs, means coupling the first output of said first signal means to the second electrodes of first selected ones of said transistors, means coupling the second output of said first signal means to the second electrodes of other ones of said transistors, means coupling the first output of said second signal means to the third electrodes of second selected ones of said transistors, and means coupling the second output of said second signal means to the third electrodes of other ones of said transistors, the combination of transistors comprising said second selected transistors including at least one transistor common to and at least one transistor different from the combination of transistors comprising said first selected transistors.

2. A function table comprising a plurality of loads, means coupling an energization source to each of said loads, including a plurality of control circuits respectively coupled to said loads to provide different impedances in circuit with said loads to control the energization thereof, each of said control circuits including at least one transistor means, a plurality of binary signal control means each having first and second signal outputs, said first outputs from a first one of said binary means being respectively coupled to like electrodes of certain ones of said transistor means and said second outputs from said first binary means being respectively coupled to like electrodes of other ones of said transistor means, said first outputs from a second one of said binary means being coupled to like electrodes of certain ones of said transistor means and said second outputs from said second binary means being respectively coupled to like electrodes of other ones of said transistor means, the impedances of said transistor means being in accordance with the signals applied to the respective electrodes, the coupling of said binary means outputs to said transistor means electrodes being such that each of said electrodes is coupled to but one of said outputs and each of said transistor means is coupled to one of said outputs of each of said binary means and controlled by a combination of signals therefrom, whereby said loads are energized in accordance with different combinations of said output signals.

3. The function table of claim 2 wherein said energization source comprises a constant current source.

4. A function table as recited in claim 2 wherein said transistor means are coupled to the respective loads to provide variable impedances in series with said energization source and said loads.

5. A function table as recited in claim 2 wherein said plurality of transistor means have their first like electrodes coupled to said loads at points between said loads and said energization source, and their second like electrodes returned to a point of reference potential so that said transistor means are effective to shunt current flow from said energization source to said loads in the presence of transistor-conductive signals applied to their third like electrodes by said binary means whereby a preselected combination of output signals from said binary means determines a single load to be energized.

6. A function table as recited in claim 2 wherein said plurality of transistor means have their first like electrodes coupled to said loads at points between said loads and a point of reference potential, and their second like electrodes returned to a point of reference potential so that said transistor means are in series with said loads thereby to cause energization of said loads in the presence of transistor-conductive signals applied to their third like electrodes by said binary means, whereby a preselected combination of output signals from said binary means causes energization of all except a single predetermined load.

7. A function table as recited in claim 2 wherein each of said control circuits includes a first transistor having a first electrode coupled to its respective load, second like electrodes of said first transistors being coupled in groups to first and second outputs from said first binary means, and further comprising means coupling third like electrodes of said transistors in groups to said first and second outputs of said second binary means including further transistors, said further transistors having first electrodes coupled to said groups of first transistor third electrodes, second like electrodes coupled to said first and second outputs of said second binary means and third like electrodes returned to a point of reference potential.

8. The function table of claim 7 wherein each of said control circuits is coupled to its respective load at a point between said load and said energization source thereby to provide a shunt path for current flow from said energization source.

9. The function table of claim 8 wherein each of said control circuits is coupled in a series circuit with its respective load and the energization source.

10. A function table comprising a plurality of output lines, an energization source, a separate first transistor for each output line having a first electrode coupled thereto, a load for each output line arranged in a series circuit between said energization source and said first electrode, first and second bistable means, second electrodes of said transistors being coupled to first and second outputs of said first bistable means, a plurality of further transistors, third electrodes of said first transistors being coupled to first electrodes of said further transistors, said further transistors having second electrodes coupled to first and second outputs of said second bistable means, and third electrodes connected to a common return circuit to said energization source.

11. A function table comprising a plurality of loads, an energization source, output lines coupling said energization source to each load, a separate first transistor for each output line having a first electrode coupled thereto at a point between the respective load and said energization source thereby to provide a shunt path for current flow from said energization source, first and second bistable means, second electrodes of said transistors being coupled to first and second outputs of said first bistable signal means, a plurality of further transistors, third electrodes of said first transistors being coupled to first electrodes of said further transistors, said further transistors having second electrodes coupled to first and second outputs of said second bistable signal means, and third electrodes connected to a common return circuit to said energization source.

12. A function table as recited in claim 2 wherein each of said plurality of control circuits includes an individual transistor, first like electrodes on a plurality of said individual transistors being coupled together in first groups, said first electrode groups being coupled respectively to first and second outputs of said first binary signal means, second like electrodes on a plurality of said individual transistors being coupled together in second groups, said second electrode groups being coupled respectively to first and second outputs from said second binary signal means, said first groups being different from said second groups.

13. The function table of claim 12 wherein each of said control circuits is coupled in a series circuit with its respective load and the energization source.

14. A function table comprising a plurality of loads, an energization source, output lines coupling said energization source to each of said loads, a plurality of transistors, each associated with a different output line and having a first electrode coupled thereto at a point between the respective load and said energization source, thereby to provide a shunt path for current flow from said energization source, first and second bistable signal means, second electrodes of first ones of said transistors being coupled together in first groups, third electrodes on second ones of said transistors being coupled together in second groups, said first groups being coupled respectively to first and second outputs of said first bistable signal means, said second groups being coupled respectively to first and second outputs of said second bistable signal means, the combination of transistors in said first group being different from the combination of transistors in said second group.

15. A function table comprising a plurality of output lines, an energization source, a separate transistor for each output line having a first electrode coupled thereto, a load for each output line arranged in a series circuit between said energization source and said first electrode of the respective transistor, first and second bistable means, second electrodes of first ones of said transistors being coupled together in first groups, third electrodes of second ones of said transistors being coupled together in second groups, said first groups being coupled respectively to first and second outputs of said first bistable signal means, said second groups being coupled respectively to first and second outputs of said second bistable signal means, the combination of transistors in said first group being different from the combination of transistors in said second group.

16. A function table comprising a plurality of loads, means coupling an energization source to each of said loads, including a plurality of control circuits respectively coupled to said loads to provide different impedances in circuit with said loads to control the energization thereof, each of said control circuits including at least one transistor means, a plurality of binary signal control means each having first and second signal outputs, said first output from a first one of said binary means being respectively coupled to like electrodes of certain ones of said transistor means and said second outputs from said first binary means being respectively coupled to like electrodes of other ones of said transistor means, said first outputs from a second one of said binary means being coupled to like electrodes of certain ones of said transistor means and said second outputs from said second binary means being respectively coupled to like electrodes of other ones of said transistor means, the impedances of said transistor means being in accordance with the signals applied to the respective electrodes, the coupling of said binary means outputs to said transistor means electrodes being such that each of said electrodes is coupled to but one of said outputs and each of said transistor means is coupled to one of said outputs of each of said binary means and controlled by a combination of signals therefrom, whereby said loads are energized in accordance with different combinations of said output signals, said transistor means being coupled to the respective loads to provide variable impedances in parallel combinations with said loads, said combinations being energized by said sources.

17. A function table comprising a plurality of loads, means coupling an energization source to each of said loads, including a plurality of control circuits respectively coupled to said loads to provide different impedances in circuit with said loads to control the energization thereof, each of said control circuits including at least one transistor means, a plurality of binary signal control means each having first and second signal outputs, said first outputs from a first one of said binary means being respectively coupled to like electrodes of certain ones of said transistor means and said second outputs from said first binary means being respectively coupled to like electrodes of other ones of said transistor means, said first outputs from a second one of said binary means being coupled to like electrodes of certain ones of said transistor means and said second outputs from said second binary means being respectively coupled to like electrodes of other ones of said transistor means, the impedances of said transistor means being in accordance with the signals applied to the respective electrodes, the coupling of said binary means outputs to said transistor means electrodes being such that each of said electrodes is coupled to but one of said outputs and each of said transistor means is coupled to one of said outputs of each of said binary means and controlled by a combination of signals therefrom, whereby said loads are energized in accordance with different combinations of said output signals, each of said plurality of control circuits including an individual transistor, first like electrodes on a plurality of said individual transistors being coupled together in first groups, said first electrode groups being coupled respectively to first and second outputs of said first binary signal means, second like electrodes on a plurality of said individual transistors being coupled together in second groups, said second electrode groups being coupled respectively to first and second outputs from said second binary signal means, said first groups being different from said second groups, each of said control circuits being coupled to its respective load at a point between said load and said energization source thereby to provide a shunt path for current flow from said energization source.

References Cited in the file of this patent

UNITED STATES PATENTS

| | | |
|---|---|---|
| 2,535,303 | Lewis | Dec. 26, 1950 |
| 2,627,039 | MacWilliams | Jan. 27, 1953 |
| 2,644,892 | Gehman | July 7, 1953 |
| 2,644,893 | Gehman | July 7, 1953 |
| 2,673,936 | Harris | Mar. 30, 1954 |
| 2,695,398 | Anderson | Nov. 23, 1954 |
| 2,706,811 | Steele | Apr. 19, 1955 |
| 2,722,649 | Immel et al. | Nov. 1, 1955 |
| 2,773,250 | Aigrain et al. | Dec. 4, 1956 |
| 2,825,889 | Henle | Mar. 4, 1958 |

OTHER REFERENCES

Rectifier Networks for Multiposition Switching, proceedings of the I.R.E., February 1949, pp. 139–147.